US011717126B2

(12) United States Patent
Hwang et al.

(10) Patent No.: US 11,717,126 B2
(45) Date of Patent: Aug. 8, 2023

(54) MOTOR ASSEMBLY, METHOD OF MANUFACTURING THE SAME AND A CLEANER HAVING THE SAME

(71) Applicant: Samsung Electronics Co., Ltd., Suwon-si (KR)

(72) Inventors: Woong Hwang, Suwon-si (KR); Ji Min Kim, Suwon-si (KR); Tae Sang Park, Suwon-si (KR); Kee Yeon Cho, Suwon-si (KR); Jin Woo Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 465 days.

(21) Appl. No.: 17/052,514

(22) PCT Filed: May 3, 2019

(86) PCT No.: PCT/KR2019/005337
§ 371 (c)(1),
(2) Date: Nov. 2, 2020

(87) PCT Pub. No.: WO2019/212294
PCT Pub. Date: Nov. 7, 2019

(65) Prior Publication Data
US 2021/0235951 A1    Aug. 5, 2021

(30) Foreign Application Priority Data

May 3, 2018    (KR) .................... 10-2018-0051101

(51) Int. Cl.
| F01D 5/00 | (2006.01) |
| A47L 9/22 | (2006.01) |
| A47L 5/24 | (2006.01) |

(Continued)

(52) U.S. Cl.
CPC .................... *A47L 9/22* (2013.01); *A47L 5/24* (2013.01); *F04D 25/00* (2013.01); *F04D 29/00* (2013.01); *H02K 5/04* (2013.01)

(58) Field of Classification Search
CPC .. F04D 29/444; F04D 29/4253; F04D 17/165; A47L 5/22; A47L 9/22

(Continued)

(56) References Cited

U.S. PATENT DOCUMENTS

2014/0147311 A1    5/2014  Jung et al.
2015/0337856 A1*  11/2015  Hwang ................. F04D 29/263
                                                                    415/174.3

(Continued)

FOREIGN PATENT DOCUMENTS

| JP | 2003-065298 A | 3/2003 |
| JP | 2005-226608 A | 8/2005 |

(Continued)

OTHER PUBLICATIONS

International Search Report dated Aug. 9, 2019 in connection with International Patent Application No. PCT/KR2019/005337, 2 pages.

*Primary Examiner* — Long T Tran
*Assistant Examiner* — James J Kim

(57) ABSTRACT

A motor assembly comprises a stator, a rotor configured to be rotated about a shaft by electromagnetically interacting with the stator, an impeller configured to be rotated with the rotor about the shaft by being coupled to the rotor and configured to suction air in response to a rotation, a housing configured to cover between the impeller and the stator by being coupled to the stator, a cover comprising an inlet through which air sucked by the impeller is introduced, and configured to cover the impeller, a guide member configured to guide the air discharged from the impeller and configured to be coupled to the housing, and a plurality of first vanes protruding from one of the cover and the guide member to (Continued)

an axial direction and coupled to the other of the cover and the guide member. The cover and the guide member are configured to be movable in the axial direction in response to not being coupled to the housing, and the cover comprises a contact portion in contact with the impeller according to a position of the cover. The contact portion is spaced apart from the impeller in response to coupling between the guide member and the housing.

10 Claims, 14 Drawing Sheets

(51) Int. Cl.
    *H02K 5/04*         (2006.01)
    *F04D 25/00*       (2006.01)
    *F04D 29/00*       (2006.01)

(58) Field of Classification Search
    USPC .......................................................... 415/71
    See application file for complete search history.

(56) References Cited

U.S. PATENT DOCUMENTS

| | | | |
|---|---|---|---|
| 2016/0037984 A1* | 2/2016 | Park | F04D 29/626 15/326 |
| 2021/0330146 A1* | 10/2021 | Park | A47L 5/22 |
| 2021/0408868 A1* | 12/2021 | Park | H02K 7/14 |

FOREIGN PATENT DOCUMENTS

| | | |
|---|---|---|
| JP | 2007-162513 A | 6/2007 |
| JP | 2010-281231 A | 12/2010 |
| JP | 2012-184692 A | 9/2012 |
| JP | 2013-227937 A | 11/2013 |
| JP | 2014-105706 A | 6/2014 |
| KR | 10-2013-0049570 A | 5/2013 |
| KR | 10-2015-0140200 A | 12/2015 |

\* cited by examiner

MOTOR ASSEMBLY, METHOD OF MANUFACTURING THE SAME AND A CLEANER HAVING THE SAME

CROSS-REFERENCE TO RELATED APPLICATIONS

This application is a 371 of International Application No. PCT/KR2019/005337 filed on May 3, 2019, which claims priority to Korean Patent Application No. 10-2018-0051101 filed on May 3, 2018, the disclosures of which are herein incorporated by reference in their entirety.

BACKGROUND

1. Field

The present disclosure relates to a motor assembly having improved suction performance, a manufacturing method thereof, and a cleaner including the same.

2. Description of Related Art

In general, a motor is a machine that generates torque from electric energy, and includes a stator and a rotor. The rotor is configured to interact electromagnetically with the stator and is rotated by force that acts between a magnetic field and the current flowing through a coil.

The motor may be used in various home appliances, for example, a cleaner.

A cleaner is a home appliance that filters out foreign substances in the inside of a cleaning body after suctioning air containing foreign substances such as dust by using air pressure generated by a motor installed inside the cleaning body.

The motor generates a suction force by lowering an internal pressure by discharging air in the cleaner to the outside. The generated suction force allows foreign substances, which is such as dust on a surface to be cleaned, to be sucked together with external air through suction means and allows a dust collector to remove the foreign substances.

The motor may include an impeller configured to be rotated with the rotor to generate a suction force, a cover disposed to surround the impeller, and a guide member configured to guide air passing through the impeller together with the cover.

A plurality of vanes may be provided in the cover or the guide member to increase the pressure of the air passing through the impeller. It is appropriate that there is no gap between the plurality of vanes and the cover or the guide member in order to improve the suction performance of the motor.

In addition, a predetermined distance is provided between the impeller and the cover, and the suction performance of the motor is maximized in response to the minimum distance. Therefore, it is appropriate that the distance between the impeller and the cover is minimized, but the contact between the impeller and the cover is required to be prevented by an assembly tolerance or the like.

The present disclosure is directed to providing a motor assembly having improved suction performance by eliminating a gap between a plurality of radial vanes and a cover or a guide member by integrating the cover with the guide member, a manufacturing method thereof, and a cleaner including the same.

Further, the present disclosure is directed to providing a motor assembly having improved reliability by maintaining a constant distance between an impeller and a cover, regardless of assembly tolerances of various parts, a manufacturing method thereof, and a cleaner including the same.

Further, the present disclosure is directed to providing a motor assembly having improved suction performance by maintaining a minimum distance between an impeller and a cover while preventing contact between the impeller and the cover, a manufacturing method thereof, and a cleaner including the same.

SUMMARY

One aspect of the present disclosure provides a motor assembly including a stator, a rotor configured to be rotated about a shaft by electromagnetically interacting with the stator, an impeller coupled to the rotor to be rotated with the rotor about the shaft and configured to suction air in response to a rotation, a housing configured to cover between the impeller and the stator by being coupled to the stator, a cover including an inlet through which air sucked by the impeller is introduced, and configured to cover the impeller, a guide member configured to guide air discharged from the impeller and configured to be coupled to the housing, and a plurality of first vanes protruding from one of the cover and the guide member to an axial direction and coupled to the other of the cover and the guide member. The cover and the guide member are configured to be movable in the axial direction in response to not being coupled to the housing, and the cover includes a contact portion in contact with the impeller according to a position of the cover. The contact portion is spaced apart from the impeller in response to coupling between the guide member and the housing.

The guide member may include a stopper configured to limit a range of axial movement of the guide member in response to that the guide member is not coupled to the housing, and the stopper may be in contact with the housing so as to prevent the housing from passing through the guide member in the axial direction.

A shortest distance between the stopper and the housing in the axial direction may be greater than a shortest distance between the cover and the impeller in the axial direction.

The plurality of first vanes protruding from one of the cover and the guide member to the axial direction may be ultrasonically welded to the other one of the cover and the guide member to be integrated.

The cover or the guide member may further include an energy director configured to correspond to a bonding surface of the first vane and provided to protrude toward the bonding surface, and a protruding guide configured to guide ultrasonic wielding between the bonding surface and the energy director.

The guide member may further include an inner casing coupled to the housing, an outer casing disposed along an outer circumference of the inner casing to be spaced apart from the inner casing, and a plurality of second vanes configured to connect the inner casing to the outer casing and configured to guide air discharged from the impeller.

The guide member and the housing may be coupled to each other by applying an adhesive to between an inner circumferential surface of the guide member and an outer circumferential surface of the housing.

The guide member may further include a plurality of first grooves disposed to be spaced apart along the inner circumferential surface of the guide member to allow an adhesive to be uniformly applied between the inner circumferential surface of the guide member and the outer circumferential surface of the housing.

The guide member may further include a plurality of second grooves provided at corresponding positions of each of the plurality of first grooves, having a smaller width than the first groove, and configured to allow air between the inner circumferential surface of the guide member and the outer circumferential surface of the housing to escape.

The guide member may further include a test hole having a greater diameter than the impeller to allow the impeller to pass therethrough, and the test hole may show whether or not the plurality of first vanes is normally coupled to the cover or the guide member.

Another aspect of the present disclosure provides a cleaner including a cleaner body, a suction head configured to suck foreign substances on a surface to be cleaned toward the cleaner body, and a motor assembly disposed inside the cleaner body. The motor assembly includes a motor including a stator, a rotor and a housing, an impeller coupled to a shaft of the rotor to be rotated about the shaft, and a cover unit configured to guide air, which is sucked by the impeller, by covering the impeller, and coupled to the housing. The cover unit is movable in an axial direction in response to not being coupled to the housing, and the cover unit is coupled to the housing after being moved toward the axial direction so as to be in contact with the impeller and then being spaced apart from the impeller.

The cover unit may include an inlet through which air, which is sucked by the impeller, is introduced, a cover configured to cover the impeller, and a guide member configured to guide air discharged from the impeller, and configured to be coupled to the housing.

A shortest distance between the guide member and the housing in the axial direction may be greater than a shortest distance between the cover and the impeller in the axial direction.

The motor assembly may further include a plurality of radial vanes protruding from one of the cover and the guide member to the axial direction and configured to be coupled to the other one of the cover and the guide member.

The guide member may further include an inner casing coupled to the housing, an outer casing disposed along an outer circumference of the inner casing to be spaced apart from the inner casing, and a plurality of axial vanes configured to connect the inner casing to the outer casing and configured to guide air discharged from the impeller.

Another aspect of the present disclosure provides a manufacturing method of a motor assembly including coupling a plurality of radial vanes protruding in an axial direction from one of a cover and a guide member to the other of the cover and the guide member, moving the cover and the guide member toward a first direction parallel to the axial direction until the cover is in contact with an impeller, moving the cover and the guide member toward a second direction opposite to the first direction to generate a predetermined distance between the cover and the impeller in response to contact between the cover and the impeller, and coupling the cover and the guide member to the housing.

The plurality of radial vanes and the cover or the guide member may be coupled using ultrasonic welding.

The cover and the guide member may be moved by 0.1 mm to 0.7 mm in the second direction in response to the contact between the cover and the impeller.

The guide member and the housing may be coupled to each other by applying an adhesive between an inner circumferential surface of the guide member and an outer circumferential surface of the housing.

The guide member may include a plurality of grooves disposed to be spaced apart along the inner circumferential surface of the guide member, and an adhesive may be injected into the plurality of grooves in response to coupling between the guide member and the housing.

A cover and a guide member are integrated to eliminate a gap between a plurality of radial vanes and the cover or the guide member and thus, the suction performance of a motor assembly may be improved.

Regardless of assembly tolerances of various parts, it is possible to maintain a constant distance between an impeller and a cover, and thus manufacturing reliability of a motor assembly may be improved.

While preventing contact between an impeller and a cover, it is possible to maintain a minimum distance between the impeller and the cover, thereby improving the suction performance of a motor assembly.

DETAILED DESCRIPTION

Figure 1:
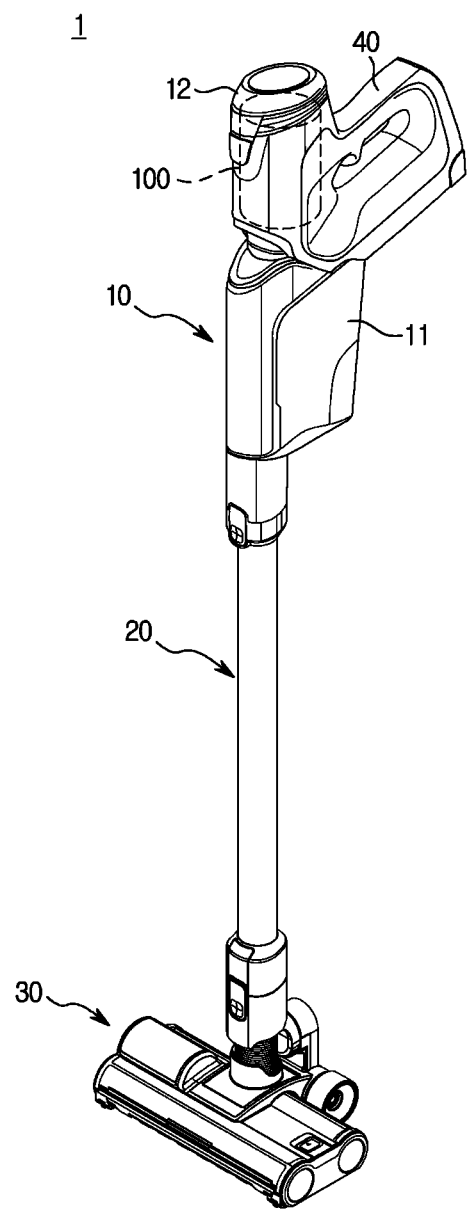
FIG. 1 is a view illustrating a stick type cleaner including a motor assembly according to one embodiment of the present disclosure.

Embodiments described in the disclosure and configurations shown in the drawings are merely examples of the embodiments of the disclosure, and may be modified in various different ways at the time of filing of the present application to replace the embodiments and drawings of the disclosure.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element.

Hereinafter exemplary embodiments of the present disclosure will be described in detail with reference to the accompanying drawings.

FIG. 1 is a view illustrating a stick type cleaner including a motor assembly according to one embodiment of the present disclosure.

As shown in FIG. 1, a cleaner including a motor assembly 100 according to the present disclosure may include a stick-type cleaner 1. However, it is not limited thereto, and for example, the motor assembly 100 according to the present disclosure may be used in an upright-type cleaner.

In addition, the motor assembly 100 may be applied to various home appliances other than a cleaner. Hereinafter a description will be given focusing on the stick-type cleaner 1 including the motor assembly 100.

The cleaner 1 may include a cleaner body 10 and a suction head 30. The cleaner 1 may include a stick 20 configured to connect the cleaner body 10 to the suction head 30, and a handle portion 40 connected to the cleaner body 10.

The handle portion 40 is a part that is coupled to the cleaner body 10 and thus a user may manipulate the cleaner 1 by gripping the handle portion 40. A controller (not shown) may be provided in the handle portion 40 so as to allow a user to control the cleaner 1.

The suction head 30 may be provided under the cleaner body 10 and disposed to be in contact with a surface to be cleaned. The suction head 30 may be provided to be in contact with a surface to be cleaned to suction dust or dirt on the surface to be cleaned toward an inside of the cleaner body 10 by a suction force generated by the motor assembly 100.

The cleaner body 10 may include a dust collector 11 and a drive device 12 provided therein. The dust collector 11 may be configured to collect dust or dirt that is on the surface to be cleaned and then sucked through the suction head 30.

The drive device 12 may include the motor assembly 100 configured to drive the cleaner 1. The motor assembly 100 may generate power to generate a suction force in the cleaner body 10.

Figure 2:
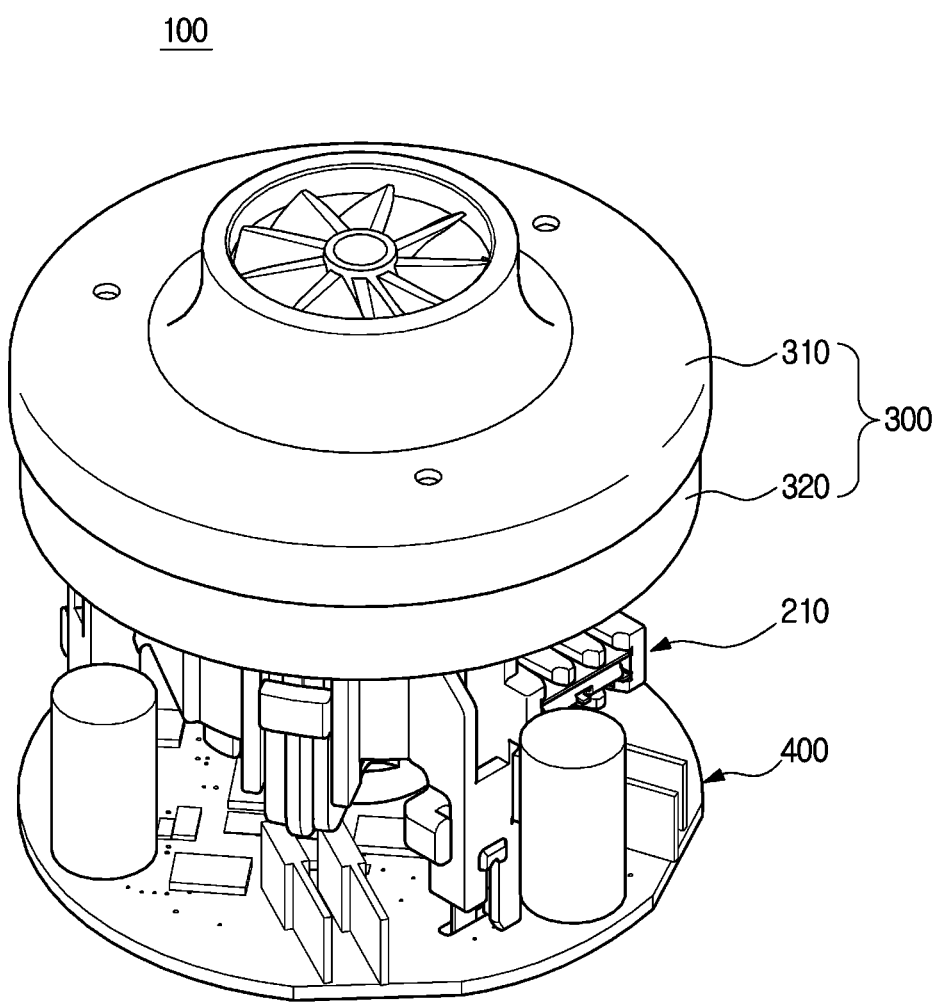
FIG. 2 is a perspective view of the motor assembly according to one embodiment of the present disclosure.
Figure 3:
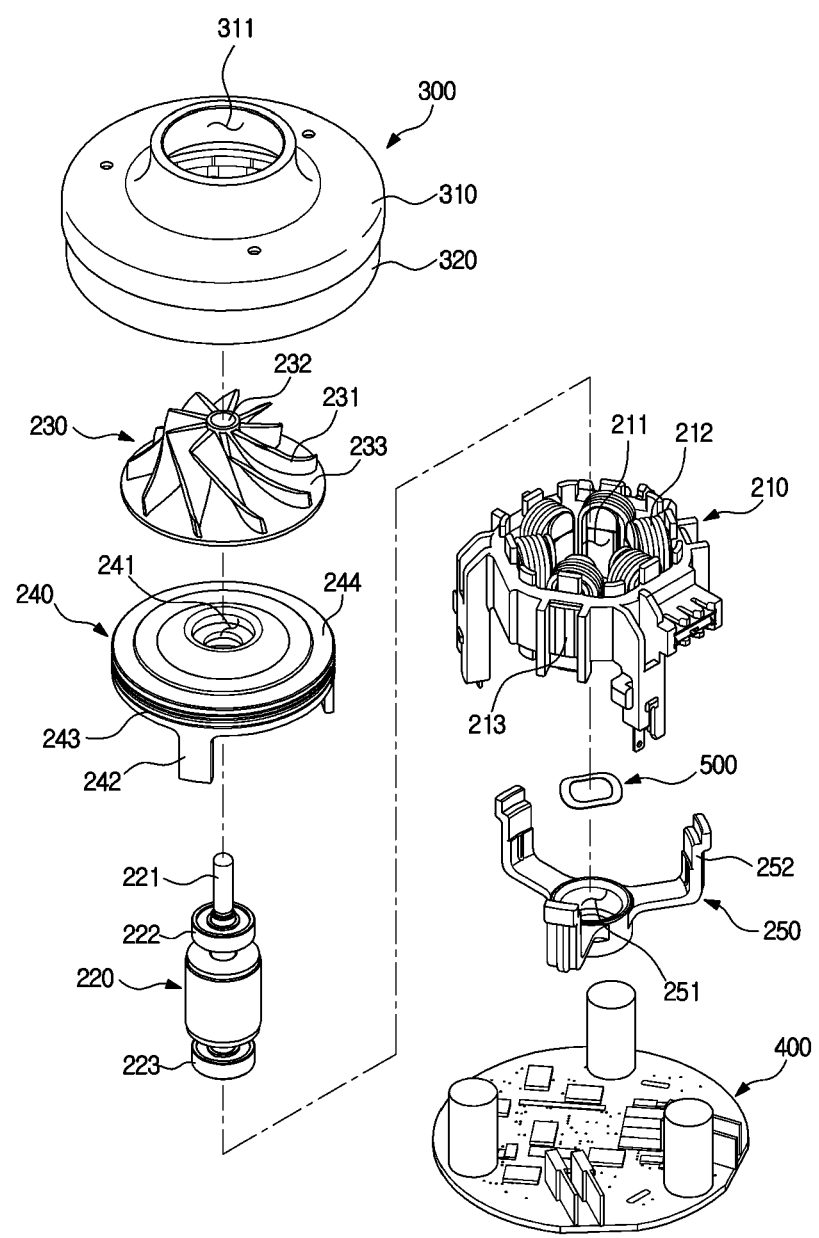
FIG. 3 is an exploded perspective view of the motor assembly according to one embodiment of the present disclosure.

FIG. 2 is a perspective view of the motor assembly according to one embodiment of the present disclosure. FIG. 3 is an exploded perspective view of the motor assembly according to one embodiment of the present disclosure.

As shown in FIGS. 2 and 3, the motor assembly 100 may include a motor including a stator 210, a rotor 220 and housings 240 and 250, an impeller 230 configured to generate a flow of air by being coupled to a rotating shaft 221 of the rotor 220, a cover unit 300 configured to cover the impeller 230 and configured to guide air that is sucked by the impeller 230, and a controller 400 configured to control the motor.

The motor may include the stator 210, the rotor 220 and the housing 240 and 250.

The stator 210 may be configured to generate a magnetic flux in response to application of the current to a coil 212.

A rotor accommodating portion 211 configured to accommodate the rotor 220 may be provided at a central portion of the stator 210.

The stator 210 may include an insulator 213, and the insulator 213 may be formed of a material having electrical insulation.

The coil 212 may be wound over the stator 210 while the insulator 213 is coupled to the stator 210.

The rotor 220 may be disposed in the rotor accommodating portion 211 of the stator 210. The rotor 220 may electromagnetically interact with the stator 210.

The rotor 220 may include the rotating shaft 221 and bearings 222 and 223.

The rotating shaft 221 may be configured to be rotated in response to electromagnetic interaction between the rotor 220 and the stator 210.

The bearings 222 and 223 may include the first bearing 222 coupled to an upper side of the rotating shaft 221 and the second bearing 223 coupled to a lower side of the rotating shaft 221.

The first bearing 222 may be disposed between the first housing 240 and the rotating shaft 221 to support the rotating shaft 221 so as to allow the rotating shaft 221 to be rotated while a rotation axis of the rotating shaft 221 is fixed.

The second bearing 223 may be disposed between the second housing 250 and the rotating shaft 221 to support the rotating shaft 221 so as to allow the rotating shaft 221 to be rotated while the rotation axis of the rotating shaft 221 is fixed.

The housings 240 and 250 may be configured to be coupled to the stator 210. The housings 240 and 250 may include the first housing 240 and the second housing 250.

The first housing 240 may be coupled to the second housing 250 with the rotor 220 and the stator 210 being interposed therebetween. As the first housing 240 is coupled to the second housing 250, the rotor 220 may be fixed to the stator 210.

The first housing 240 may include a first bearing seating portion 241 on which the first bearing 222 is seated, and a first coupler 242 extending in an axial direction and coupled to the second housing 250.

The first housing 240 may be provided in an approximately cylindrical shape, and the first housing 240 may include an outer circumferential surface 243 provided to surround a part of a side surface of the stator 210 and the rotor 220, and an upper surface 244 provided to cover an upper surface of the stator 210 and the rotor 220.

The first coupler 242 may extend in the axial direction from the outer circumferential surface 243 of the first housing. The first coupler 242 may be provided to be spaced apart along a circumferential direction of the first housing 240, and may be provided in plural. For example, as shown in FIG. 3, three first couplers 242 may be provided, but the number of the first coupler 242 may vary.

The second housing 250 may include a second bearing seating portion 251 on which the second bearing 223 is seated, and a second coupler 252 configured to be coupled to the first coupler 242 of the first housing.

The second coupler 252 may be provided to correspond to the number of the first coupler 242. The first coupler 242 and the second coupler 252 may be coupled by various known methods. For example, the first coupler 242 may be coupled to the second coupler 252 by force-fitting method.

The motor assembly 100 may include the impeller 230 coupled to the rotating shaft 221 of the rotor 220 to generate a flow of air.

The impeller 230 may include a shaft coupler 232 to which the rotating shaft 221 is coupled. The impeller 230 may be rotated together with the rotating shaft 221 in response to coupling between the rotating shaft 221 and the shaft coupler 232.

The impeller 230 may include a hub 233 and a plurality of blades 231 protruding from the hub 233 to form a flow of air.

The hub 233 may be provided to have a smaller cross-sectional area along the axial direction of the rotating shaft 221 so as to discharge the air, which is introduced in the axial direction according to a rotation of the impeller 230, toward a radial direction of the rotating shaft 221.

The plurality of blades 231 may be installed on the hub 233 and configured to be rotated together with the hub 233, thereby forming the flow of air. The plurality of blades 231 may be provided on an outer surface of the hub 233.

The rotor 220 may be disposed on an inner surface of the hub 233, and the plurality of blades 231 may be disposed on the outer surface of the hub 233 thereby forming the flow of air.

The cover unit 300 may include a cover 310 configured to cover the impeller 230 and a guide member 320 configured to guide the air sucked by the impeller 230. The cover unit 300 may be configured to be coupled to the first housing 240. A method of coupling the cover unit 300 to the first housing 240 will be described later.

The motor assembly 100 may further include the controller 400 configured to control the speed of the motor. The controller 400 may be disposed under the motor, but is not limited thereto. The controller 400 may be disposed at various positions according to the type of the cleaner.

The motor assembly 100 may further include a washer 500 disposed between the second housing 250 and the second bearing 223. The washer 500 may apply a preload to the bearing 223.

Figure 4:
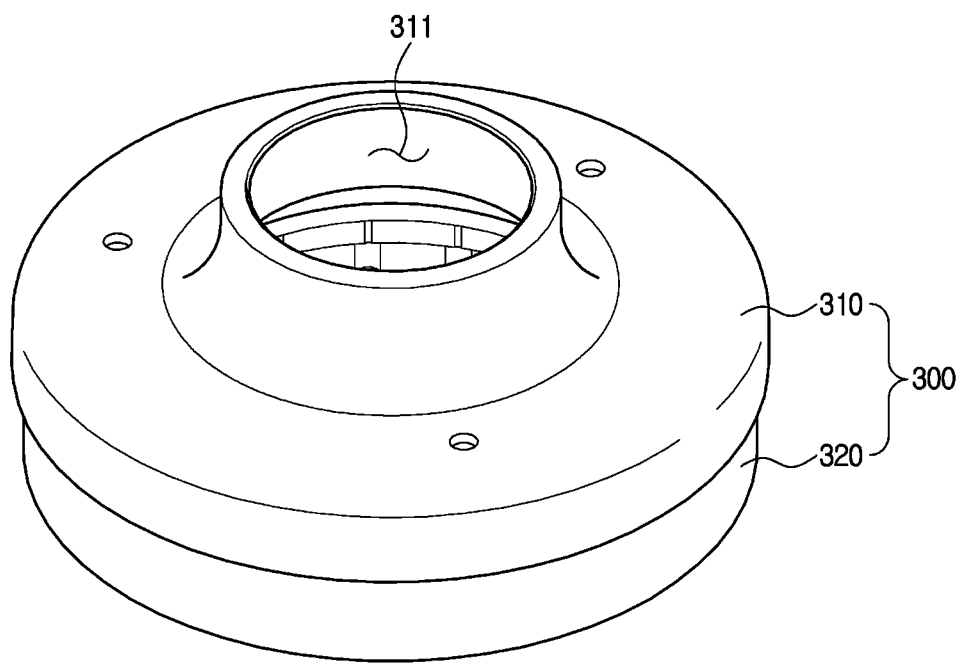
FIG. 4 is a perspective view of a cover unit in the motor assembly according to one embodiment of the present disclosure.
Figure 5:
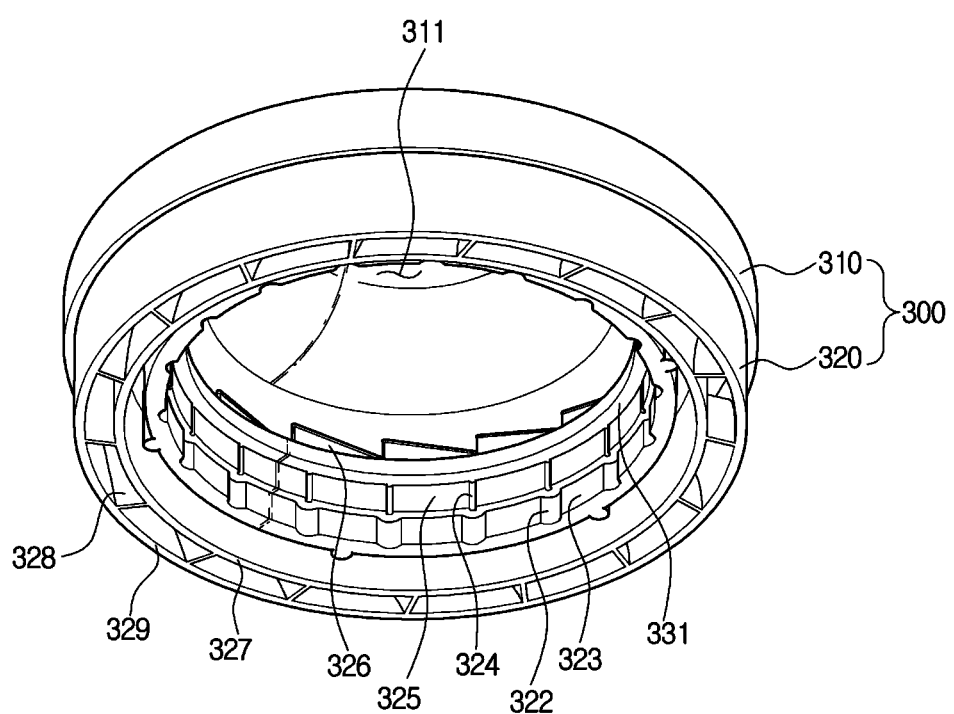
FIG. 5 is a bottom perspective view of the cover unit shown in FIG. 4.
Figure 6:
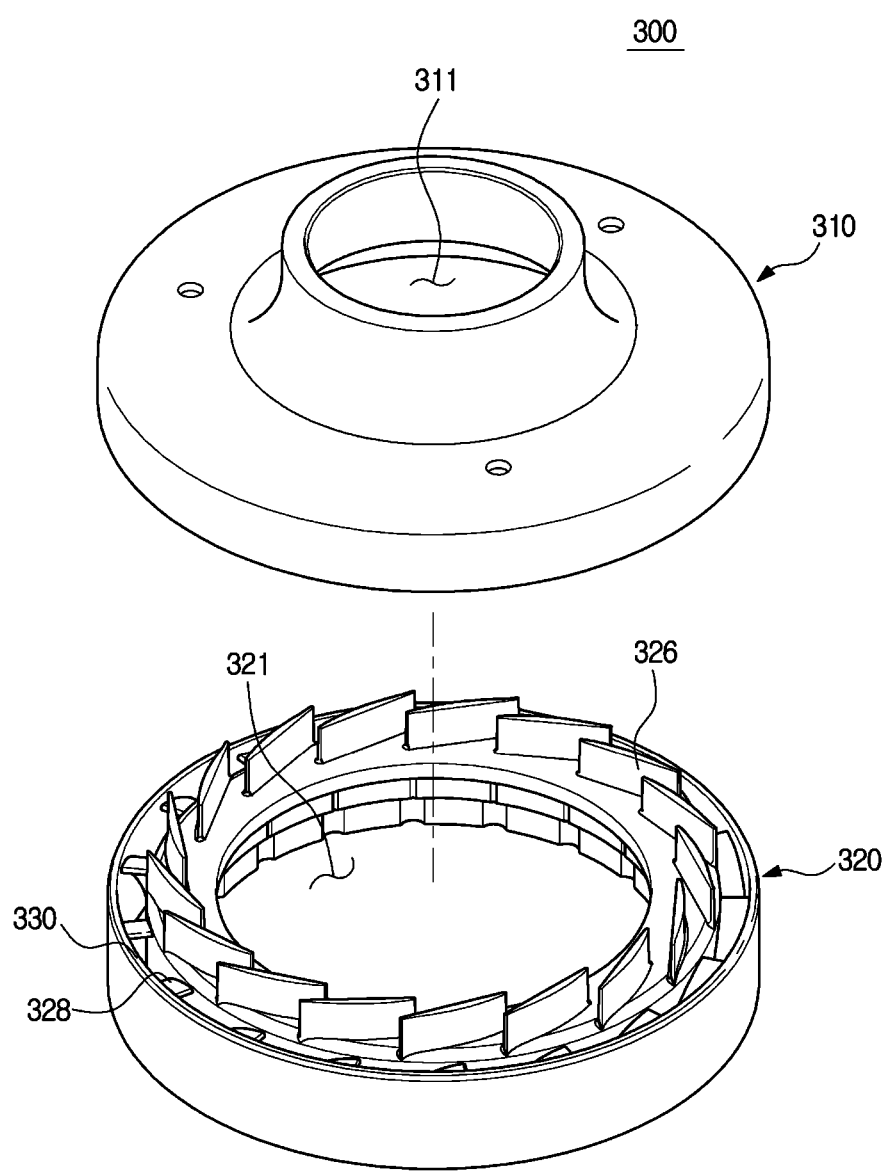
FIG. 6 is a view illustrating a cover and a guide member according to one embodiment of the present disclosure.
Figure 7:
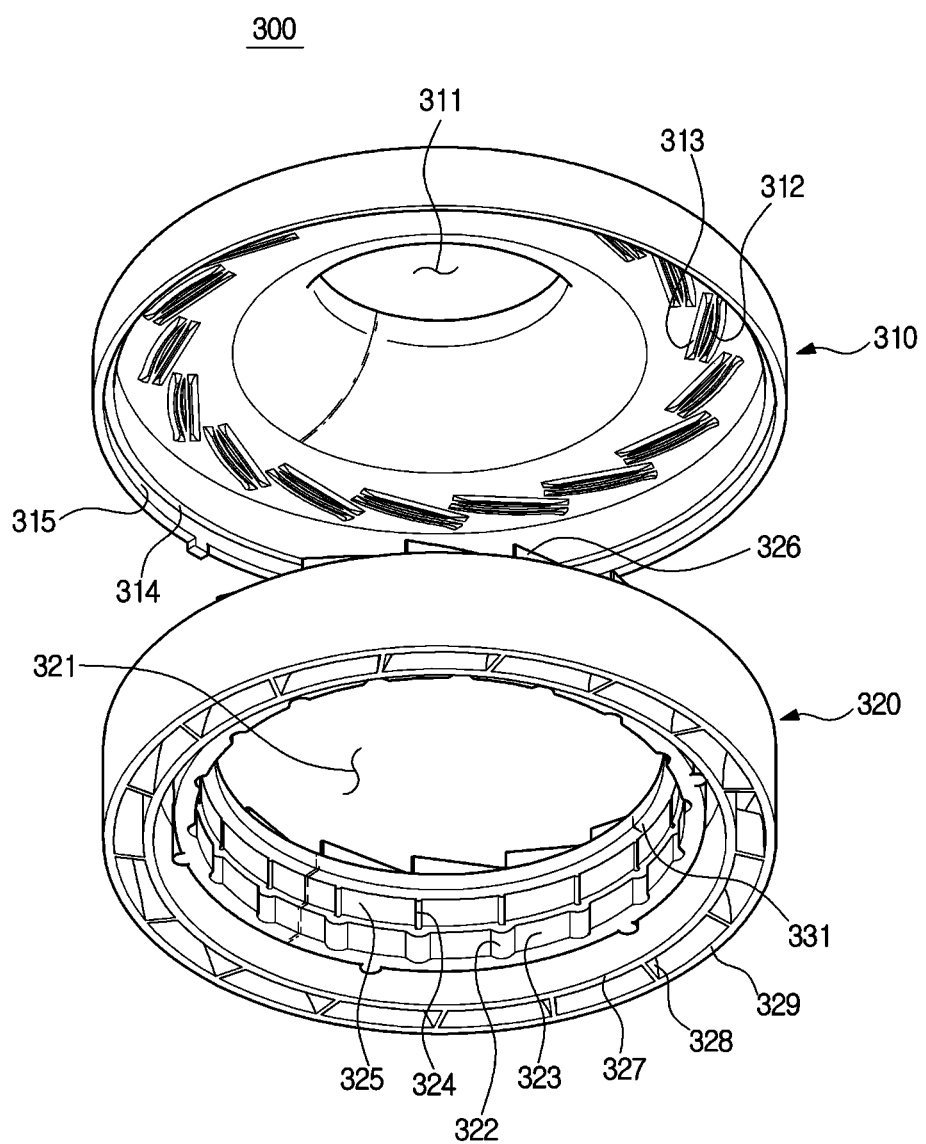
FIG. 7 is a view illustrating the cover and the guide member shown in FIG. 6 when viewed from a different angle.

FIG. 4 is a perspective view of a cover unit in the motor assembly according to one embodiment of the present disclosure. FIG. 5 is a bottom perspective view of the cover unit shown in FIG. 4. FIG. 6 is a view illustrating a cover and a guide member according to one embodiment of the present disclosure. FIG. 7 is a view illustrating the cover and the guide member shown in FIG. 6 when viewed from a different angle.

Hereinafter a method of coupling the cover to the guide member according to one embodiment of the present disclosure will be described in detail with reference to FIGS. 4 to 7.

The cover unit 300 may be provided in such a way that the cover 310 is coupled the guide member 320 so as to be integrated with each other.

FIGS. 4 and 5 are views illustrating the cover unit 300 in a state in which the cover 310 is coupled to the guide member 320.

As shown in FIG. 5, the guide member 320 may include a plurality of radial vanes 326. The plurality of radial vanes 326 may guide air, which is sucked in the axial direction by the impeller 230, to be discharged to the radial direction. In addition, the kinetic energy of the air sucked by the impeller 230 may be converted into pressure while passing through the plurality of radial vanes 326.

According to one embodiment of the present disclosure, the plurality of radial vanes 326 may be formed to protrude from the guide member 320 to the axial direction of the rotating shaft 221. Alternatively, the plurality of radial vanes may be formed to protrude from an inner surface of the cover 310 to the axial direction. Hereinafter an example in which radial vanes are provided on the guide member will be described.

The plurality of radial vanes 326 may be provided to be coupled to the inner surface of the cover 310. The coupling of the plurality of radial vanes 326 and the cover 310 may be performed by various methods. According to one embodiment of the present disclosure, the plurality of radial vanes 326 and the cover 310 may be coupled by ultrasonic welding.

Ultrasonic welding is an industrial process whereby high-frequency ultrasonic acoustic vibrations are locally applied to a partner, which is to be held, together under pressure to generate frictional heat on a surface of the partner so as to instantaneously increase a temperature of the surface of the partner to a temperature at which plastic deformation occurs. Therefore, the bonding is performed through molecular binding.

Ultrasonic welding has small deformation on the product after welding, and low power consumption. Ultrasonic welding is performed without pre-surface treatment. Particularly, the bonding is performed in a very short time, thereby improving productivity.

When the plurality of radial vanes 326 and the inner surface of the cover 310 are coupled by ultrasonic welding, a gap between each of the vanes 326 and the inner surface of the cover 310 may be completely eliminated. In a conventional manner, the cover and the guide member are coupled to each other by a force-fitting method, and a gap is formed between the plurality of radial vanes and the cover or between the plurality of radial vanes and the guide member due to the coupling structure. A leakage of air due to such a gap may cause deterioration of the suction performance of the motor assembly.

According to the present disclosure, because the plurality of radial vanes 326 and the cover 310 are integrated by ultrasonic welding, a gap between each of the plurality of radial vanes 326 and the cover 310 may be eliminated. Accordingly, the leakage of air may not occur and thus suction performance of the motor assembly may be improved.

As shown in FIG. 7, an energy director 312 and a protruding guide 313 may be provided on the inner surface of the cover 310.

The energy director 312 may be disposed at a position corresponding to the radial vane 326. The protruding guide 313 may be disposed on opposite sides of the energy director 312. The radial vanes 326 may be easily disposed at a welding position by the protruding guide 313, and in response to performing ultrasonic welding, the protruding guide may support the opposite sides of the radial vanes 326, and the energy director 312 may be integrated with an upper surface of the radial vane 326. As shown in FIG. 5, after ultrasonic welding is performed, the energy director 312 and the protruding guide 313 may be plastically deformed to change the shape thereof.

In order to improve the coupling force between the cover 310 and the guide member 320, the cover 310 may include a first coupling surface 314 and a second coupling surface 315. The first coupling surface 314 may be coupled to an upper surface 330 of an outer casing 329. The second coupling surface 315 may be coupled to an outer surface of the outer casing 329.

The guide member 320 may include a test hole 321. A diameter of the test hole 321 may be greater than a diameter of the impeller 230. Whether the plurality of radial vanes 326 is normally coupled to the cover 310 may be visually confirmed through the test hole 321. Accordingly, it is possible to check the coupling failure between the plurality of radial vanes 326 and the cover 310 before the cover unit 300 is coupled to the first housing 240. That is, it is possible to detect a coupling defect before the assembly of the motor assembly 100 further proceeds, and thus it is possible to improve production efficiency.

According to one embodiment of the present disclosure, the guide member 320 may further include a plurality of axial vanes 328.

The guide member 320 may include an inner casing 327, the outer casing 329 disposed along a circumference of the inner casing 327 to be spaced apart from the inner casing 327, and the plurality of axial vanes 328 configured to connect the inner casing 327 to the outer casing 329.

The plurality of axial vanes 328 may discharge air, which is introduced in the radial direction by passing through the plurality of radial vanes 326, toward the axial direction. The plurality of axial vanes 328 may be integrated with the guide member 320.

As shown in FIGS. 5 and 7, the guide member 320 may include a plurality of first grooves 322 and a plurality of second grooves 324.

The plurality of first grooves 322 may be spaced apart along a circumferential direction of a first inner circumferential surface 323 of the guide member 320, and the plurality of second grooves 324 may be spaced apart along a circumferential direction of a second inner circumferential surface 325 of the guide member 320.

A diameter of the first inner circumferential surface 323 of the guide member 320 may be greater than a diameter of the second inner circumferential surface 325.

The plurality of first grooves 322 may allow an adhesive to be uniformly applied between the first inner circumferential surface 323 and the outer circumferential surface 243 of the first housing 240 upon coupling the guide member 320 to the first housing 240.

The plurality of second grooves 324 may have a smaller width than the plurality of first grooves 322. The plurality of second grooves 324 may allow air between the first inner circumferential surface 323 and the outer circumferential surface 243 of the first housing to escape upon injecting the adhesive into the first groove 322. Accordingly, the plurality of second grooves 324 may prevent that the adhesive is not uniformly applied to the first inner circumferential surface 323 due to an air layer.

As mentioned above, the cover unit 300 and the first housing 240 may be coupled to each other by applying the adhesive between the first inner circumferential surface 323 of the guide member and the outer circumferential surface 243 of the first housing. However, it is not limited thereto. The coupling method of the cover unit 300 and the first housing 240 may be performed by various methods other than applying an adhesive.

Figure 8:
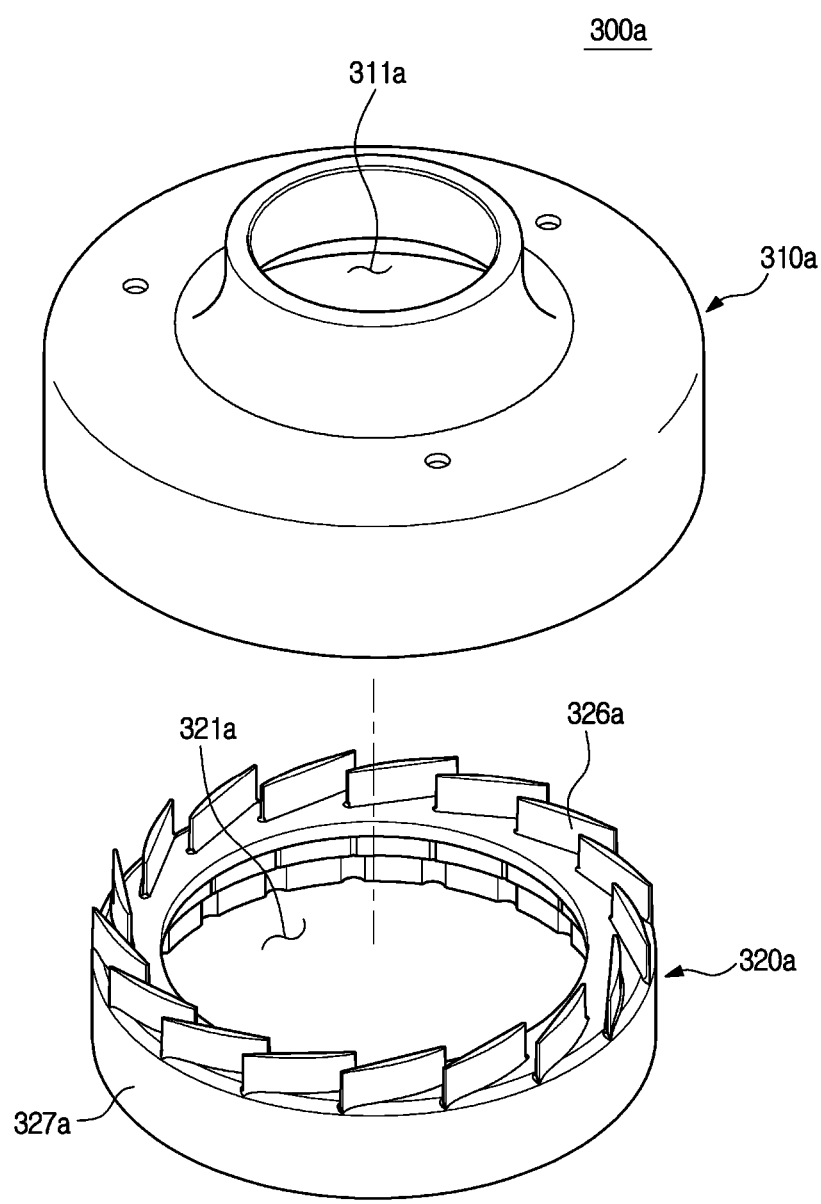
FIG. 8 is view illustrating a cover and a guide member according to another embodiment of the present disclosure.
Figure 9:
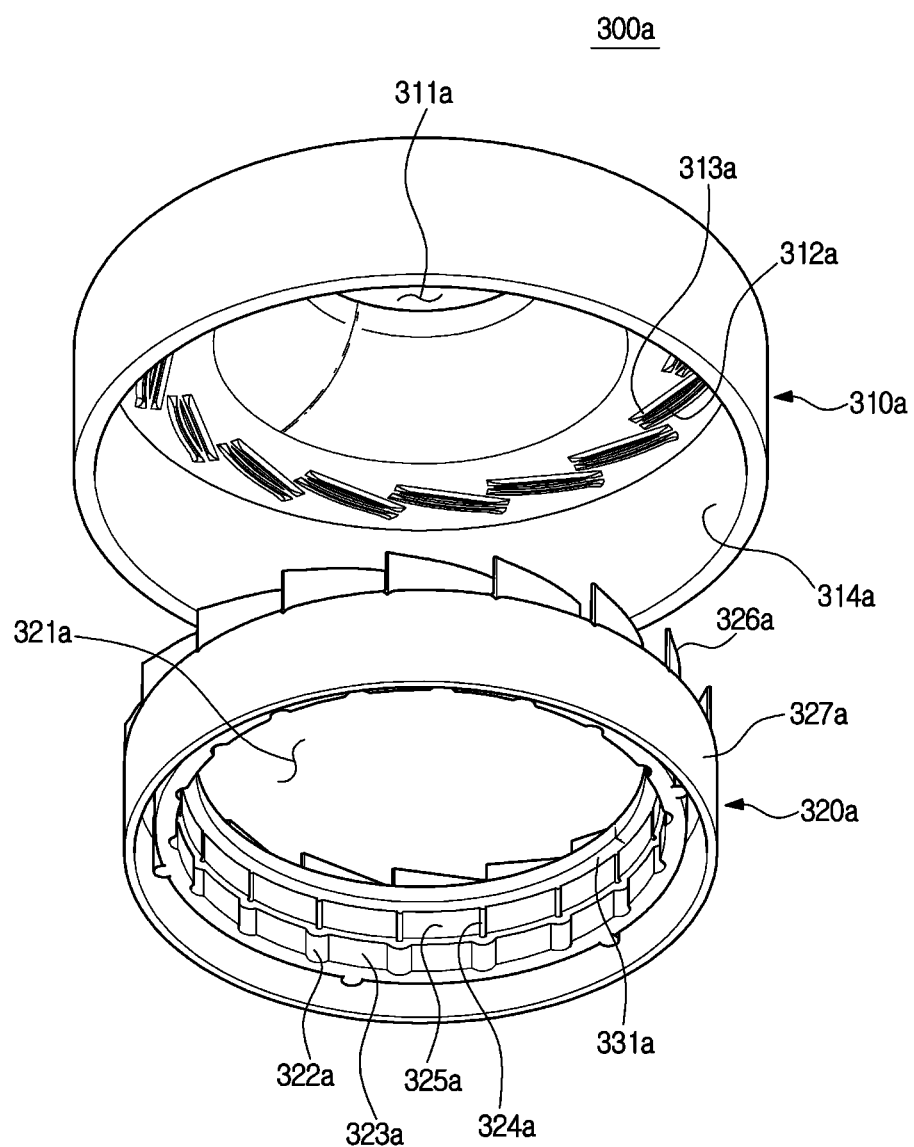
FIG. 9 is a view illustrating the cover and the guide member shown in FIG. 8 when viewed from a different angle.

FIG. 8 is view illustrating a cover and a guide member according to another embodiment of the present disclosure. FIG. 9 is a view illustrating the cover and the guide member shown in FIG. 8 when viewed from a different angle.

In a description related to another embodiment of the present disclosure, a description the same as the above mentioned description will be omitted.

As shown in FIGS. 8 and 9, according to another embodiment of the present disclosure, a cover unit 300a may include a plurality of radial vanes 326a, but may not include an axial vane. A guide member 320a may not include an outer casing. In this case, a side surface of a cover 310a may extend in an axial direction.

Figure 10:
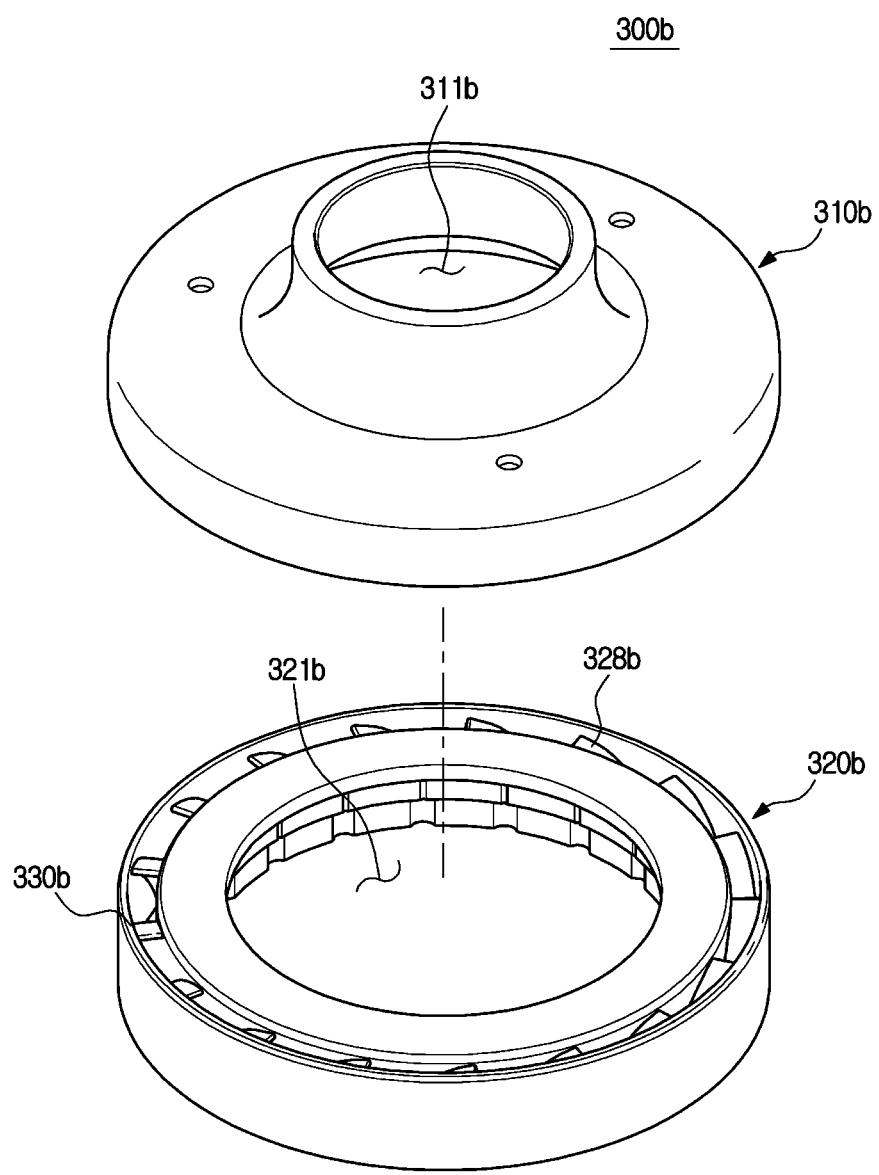
FIG. 10 is view illustrating a cover and a guide member according to another embodiment of the present disclosure.
Figure 11:
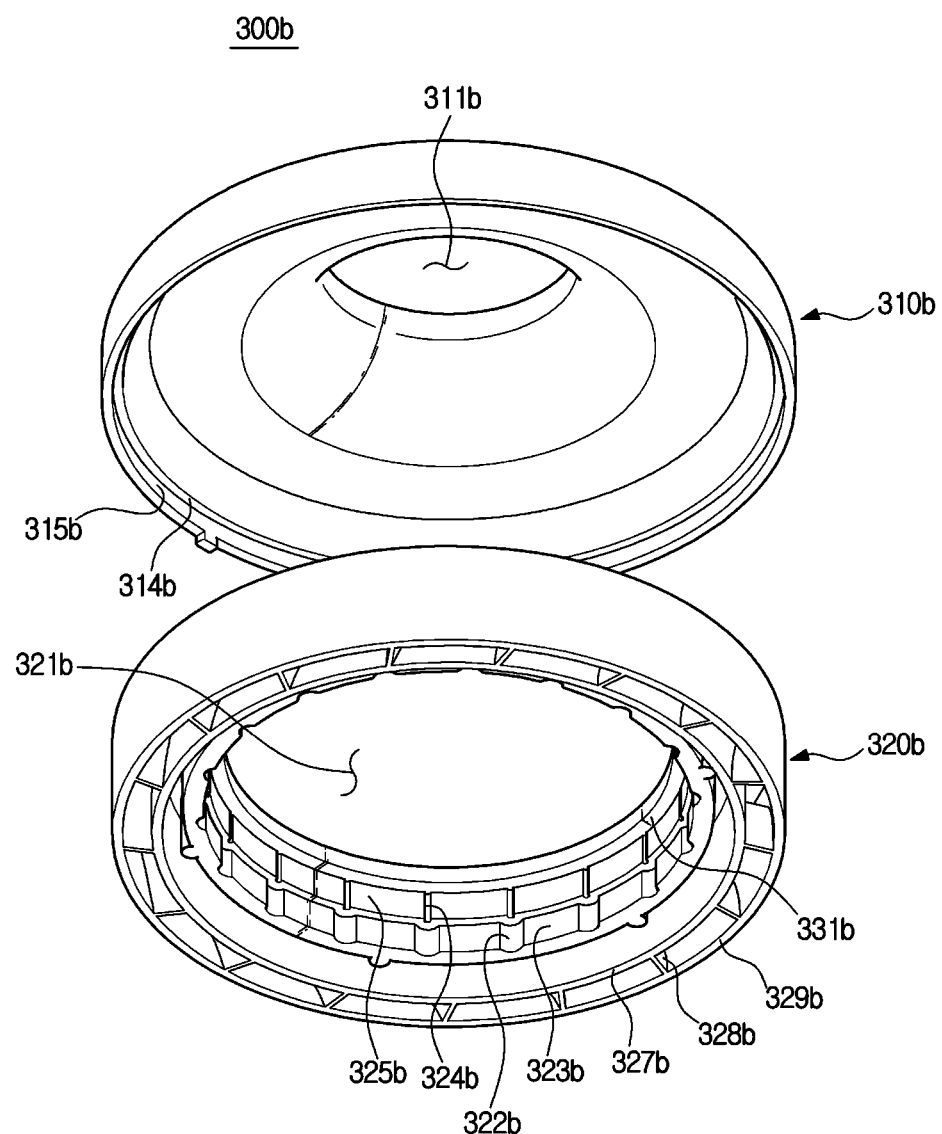
FIG. 11 is a view illustrating the cover and the guide member shown in FIG. 10 when viewed from a different angle.

FIG. 10 is view illustrating a cover and a guide member according to another embodiment of the present disclosure. FIG. 11 is a view illustrating the cover and the guide member shown in FIG. 10 when viewed from a different angle.

In a description related to another embodiment of the present disclosure, a description the same as the above mentioned description will be omitted.

As shown in FIGS. 10 and 11, according to another embodiment of the present disclosure, a cover unit 300b may include a plurality of axial vanes 328b and may not include a radial vane. A cover 310 may not include an energy director and a protruding guide.

Figure 12:
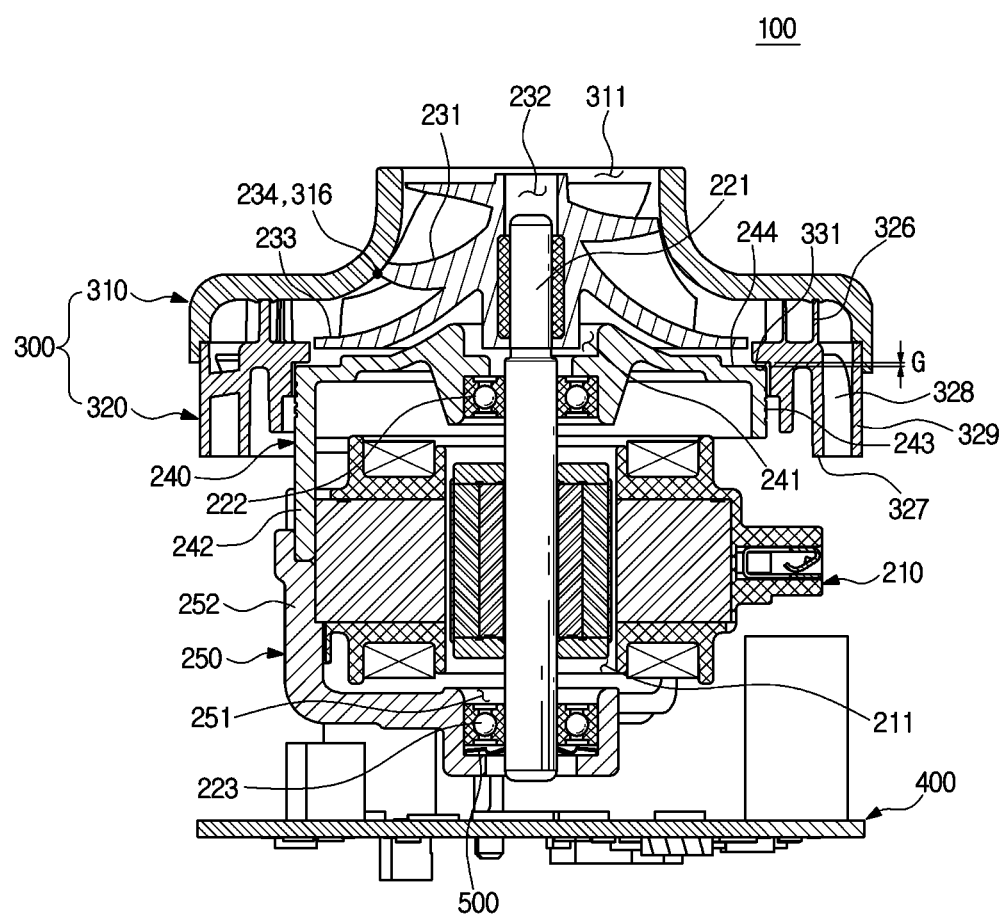
FIG. 12 is a side cross-sectional view of the motor assembly according to one embodiment of the present disclosure, illustrating a state before the cover unit is coupled to the housing.
Figure 13:
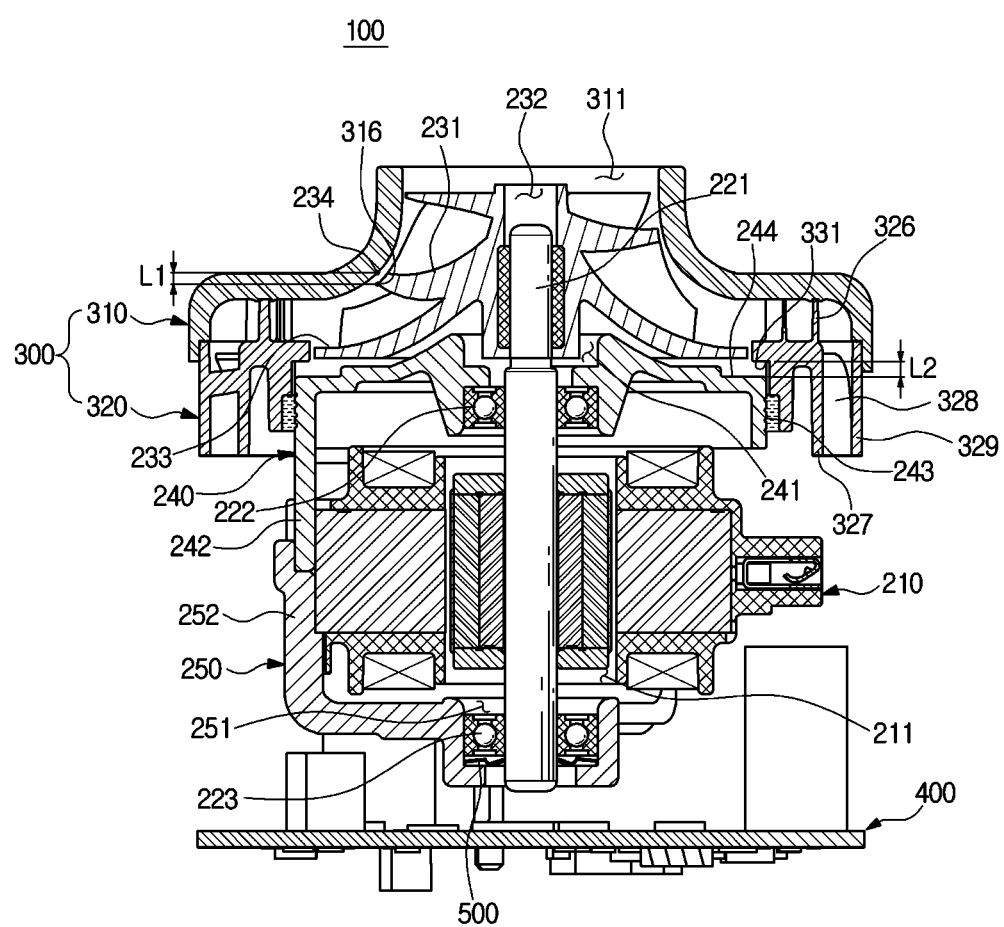
FIG. 13 is a side cross-sectional view of the motor assembly according to one embodiment of the present disclosure, illustrating a state after the cover unit is coupled to the housing.

FIG. 12 is a side cross-sectional view of the motor assembly according to one embodiment of the present disclosure, illustrating a state before the cover unit is coupled to the housing. FIG. 13 is a side cross-sectional view of the motor assembly according to one embodiment of the present disclosure, illustrating a state after the cover unit is coupled to the housing.

Hereinafter a method of coupling the cover unit and the housing according to an embodiment of the present disclosure will be described in detail.

According to the present disclosure, the cover unit 300 may be configured to be movable in the axial direction with respect to the first housing 240 before the cover unit 300 is coupled to the first housing 240.

The guide member 320 may include a stopper 331 configured to prevent the first housing 240 from moving in the axial direction and passing through the test hole 321. The stopper 331 may be in contact with the upper surface 244 of the first housing 240 to prevent the first housing 240 from passing through the test hole 321.

As shown in FIG. 13, a shortest distance L2 between the stopper 331 and the upper surface 244 of the first housing in the axial direction may be greater than a shortest distance L1 between the inner surface of the cover 310 and the impeller 230 in the axial direction.

In other words, with reference to FIG. 12, a predetermined gap G may be generated between the stopper 331 and the upper surface 244 of the first housing in response to that the cover 310 and the impeller 230 are in contact with contact portions 234 and 316.

By the structural feature according to the present disclosure, the motor assembly 100 may maintain a constant distance between the impeller 230 and the cover 310 regardless of tolerances of other components. In addition, it is possible to maintain a distance between the impeller 230 and the cover 310 according to the intention of the designer. Because the intention of the designer is to maintain a minimum distance in which the impeller 230 and the cover 310 are not in contact with each other, the motor assembly 100 according to the present disclosure may have the minimum distance between the impeller 230 and the cover 310. Accordingly, the suction performance of the motor assembly 100 may be improved.

As mentioned above, the guide member 320 may be movable in the axial direction before the guide member 320 is coupled to the first housing 240. The guide member 320 may be movable in a first direction, which is a downward direction in the drawing. As the guide member 320 is moved in the first direction, the inner surface of the cover 310 coupled to the guide member 320 may be in contact with the impeller 230. A point in which the cover 310 is in contact with the impeller 230 is referred to as the contact portions 234 and 316.

The gap G may be generated between the stopper 331 and the upper surface 244 of the first housing in response to that the cover 310 and the impeller 230 are in contact with the contact portions 234 and 316. This means that the impeller 230 is in contact with the cover 310 before the guide member 320 is moved in the first direction and then the stopper 331 is in contact with the upper surface 244 of the first housing. That is, the stopper 331 prevents the first housing 240 from passing through the test hole 321, but does not prevent the impeller 230 and the cover 310 from being in contact with each other.

As illustrated in FIG. 12, in response to the contact between the impeller 230 and the cover 310, the cover unit 300 may be moved in a second direction opposite to the first direction. In response to the movement of the cover unit 300 in the second direction, the contact portion 316 of the cover may be apart from the contact portion 234 of the impeller by a predetermined distance, as illustrated in FIG. 13. Particularly, the contact portion 316 of the cover and the contact portion 234 of the impeller may be spaced apart by L1. In this case, L1 may be a distance between the impeller 230 and the cover 310 according to the intention of the designer. For example, L1 may be approximately 0.1 mm to 0.7 mm.

After the cover 310 is spaced apart from the impeller 230 by L1 according to the intention of the designer, the guide member 320 may be coupled to the first housing 240 by applying an adhesive to the first groove 322 of the guide member. Accordingly, the distance between the impeller 230 and the cover 310 may be maintained at L1, as shown in FIG. 13.

According to the present disclosure, it is possible to couple the cover unit to the first housing after assembly of components other than the cover unit and the first housing is completed. In addition, upon coupling the cover unit to the first housing, the distance between the cover and the impeller may be adjusted regardless of the tolerance of other parts. Accordingly, the distance between the cover and the impeller may be maintained at the minimum distance according to the intention of the designer.

Figure 14:
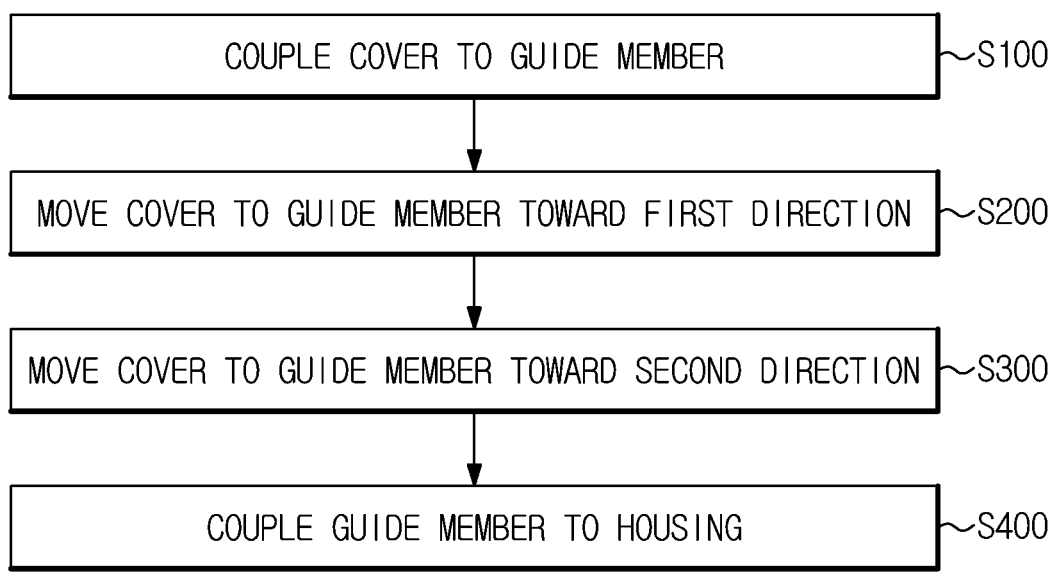
FIG. 14 is a flow chart illustrating a manufacturing method of a motor assembly according to one embodiment of the present disclosure.

FIG. 14 is a flow chart illustrating a manufacturing method of a motor assembly according to one embodiment of the present disclosure.

Hereinafter a method of manufacturing a motor assembly according to one embodiment of the present disclosure will be described.

As mentioned above, according to the method of manufacturing a motor assembly according to one embodiment of the present disclosure, at first, the cover may be coupled to the guide member (100).

A method of coupling the cover and the guide member may be provided in various ways, and as an example, the plurality of radial vanes and the cover or the guide member may be coupled by ultrasonic welding.

In response to forming an integrated cover unit by coupling the cover to the guide member, a center of the cover unit may be aligned with a center the first housing and then the cover unit may be moved in the first direction parallel to the axial direction (200).

In response to the contact between the cover and the impeller due to the movement of the cover unit in the first direction, the cover unit may be moved in a second direction opposite to the first direction in order to separate the cover from the impeller by a predetermined distance (300).

At this time, it is appropriate that the distance between the cover and the impeller is 0.1 mm to 0.7 mm.

In response to generating the distance between the cover and the impeller according to the intention of the designer, the cover unit may be coupled to the first housing, and the manufacturing of the motor assembly may be completed (400).

Upon coupling the cover unit to the first housing, an adhesive may be applied between the inner circumferential surface of the guide member and the outer circumferential surface of the first housing, thereby performing the coupling thereof.

The plurality of first grooves may be provided on the inner circumferential surface of the guide member to be spaced apart along the circumferential direction of the inner circumferential surface to allow the adhesive to be uniformly applied. By spraying the adhesive into the plurality of first grooves, it is possible to uniformly apply the adhesive to between the inner circumferential surface of the guide member and the outer circumferential surface of the first housing.

The plurality of second grooves may be provided on the inner circumferential surface of the guide member. The plurality of second grooves may have a smaller width than the plurality of first grooves. Air between the guide member and the first housing may escape through the plurality of second grooves. Therefore, upon applying the adhesive, it is possible to prevent that the adhesive is not uniformly applied caused by the air layer.

While the present disclosure has been particularly described with reference to exemplary embodiments, it should be understood by those of skilled in the art that various changes in form and details may be made without departing from the spirit and scope of the present disclosure.

The invention claimed is:

1. A motor assembly comprising:
    a stator;
    a rotor configured to be rotated about a shaft by electromagnetically interacting with the stator;
    an impeller coupled to the rotor to be rotated with the rotor about the shaft and configured to suction air in response to a rotation;
    a housing configured to cover between the impeller and the stator by being coupled to the stator;
    a cover comprising an inlet through which air sucked by the impeller is introduced, and configured to cover the impeller;
    a guide member configured to guide air discharged from the impeller and configured to be coupled to the housing; and
    a plurality of first vanes protruding from one of the cover and the guide member to an axial direction and coupled to the other of the cover and the guide member,
    wherein the cover and the guide member are configured to be movable in the axial direction in response to not being coupled to the housing, and
    the cover comprises a contact portion in contact with the impeller according to a position of the cover,
    wherein the contact portion is spaced apart from the impeller in response to coupling between the guide member and the housing.

2. The motor assembly of claim 1, wherein
the guide member comprises a stopper configured to limit a range of axial movement range of the guide member in response to that the guide member is not coupled to the housing,
wherein the stopper is in contact with the housing so as to prevent the housing from passing through the guide member in the axial direction.

3. The motor assembly of claim 2, wherein
a shortest distance between the stopper and the housing in the axial direction is greater than a shortest distance between the cover and the impeller in the axial direction.

4. The motor assembly of claim 1, wherein
the plurality of first vanes protruding from one of the cover and the guide member to the axial direction is ultrasonically welded to the other one of the cover and the guide member to be integrated.

5. The motor assembly of claim 4, wherein
the cover or the guide member further comprises an energy director configured to correspond to a bonding surface of the first vane and provided to protrude toward the bonding surface, and a protruding guide configured to guide ultrasonic wielding between the bonding surface and the energy director.

6. The motor assembly of claim 1, wherein
the guide member further comprises
an inner casing coupled to the housing;
an outer casing disposed along an outer circumference of the inner casing to be spaced apart from the inner casing; and
a plurality of second vanes configured to connect the inner casing to the outer casing and configured to guide air discharged from the impeller.

7. The motor assembly of claim 1, wherein
the guide member and the housing are coupled to each other by applying an adhesive to between an inner circumferential surface of the guide member and an outer circumferential surface of the housing.

8. The motor assembly of claim 7, wherein
the guide member further comprises a plurality of first grooves disposed to be spaced apart along the inner circumferential surface of the guide member to allow an adhesive to be uniformly applied between the inner circumferential surface of the guide member and the outer circumferential surface of the housing.

9. The motor assembly of claim 8, wherein
the guide member further comprises a plurality of second grooves provided at corresponding positions of each of the plurality of first grooves, having a smaller width smaller than the first groove, and configured to allow air between the inner circumferential surface of the guide member and the outer circumferential surface of the housing to escape.

10. The motor assembly of claim 1, wherein
the guide member further comprises a test hole having a greater diameter than the impeller to allow the impeller to pass therethrough,
wherein the test hole shows whether or not the plurality of first vanes is normally coupled to the cover or the guide member.

* * * * *